United States Patent

Todoroki et al.

[11] 4,210,505
[45] Jul. 1, 1980

[54] METHOD AND APPARATUS FOR ELECTRODEPOSITION COATING

[75] Inventors: Nobuaki Todoroki, Warabi; Junichi Yasukawa, Chigasaki; Norio Kawamura, Kawagoe; Akio Kasai, Sayama, all of Japan

[73] Assignees: Shinto Paint Co., Ltd, Amagasaki; Honda Motor Co., Ltd.; Taikisha Ltd., both of Tokyo, all of Japan

[21] Appl. No.: 960,558

[22] Filed: Nov. 14, 1978

[51] Int. Cl.² .................. C25D 13/06; C25D 13/22
[52] U.S. Cl. ...................... 204/181 C; 204/300 EC
[58] Field of Search ...... 204/181 C, 300 EC, 299 EC

[56] References Cited

U.S. PATENT DOCUMENTS

| 3,399,126 | 8/1964 | Turner | 204/181 C |
| 3,502,563 | 3/1970 | Schmidt | 204/181 R |
| 3,869,366 | 3/1975 | Suzuki et al. | 204/181 C |

*Primary Examiner*—Howard S. Williams
*Attorney, Agent, or Firm*—Wenderoth, Lind & Ponack

[57] ABSTRACT

In a method for coating an article by electrodeposition which comprises: immersing the article to be coated in a bath comprising a powder containing electrodeposition coating composition comprising a water thinnable cationic synthetic resin which is a nitrogen-containing basic resin partially neutralized with an acidic compound and a synthetic resin in the form of fine powder which is solid at a room temperature but can melt when heated;

employing as a cathode, said article to be coated;
and applying a voltage between the cathode and plural anodes placed in the bath, the improvement which comprises positioning the above-mentioned anodes to face the respective surface of said article to be coated and controlling the amount of coating on the respective surfaces of said article by regulating the quantity of electricity allowed flowing to each anode.

2 Claims, 1 Drawing Figure

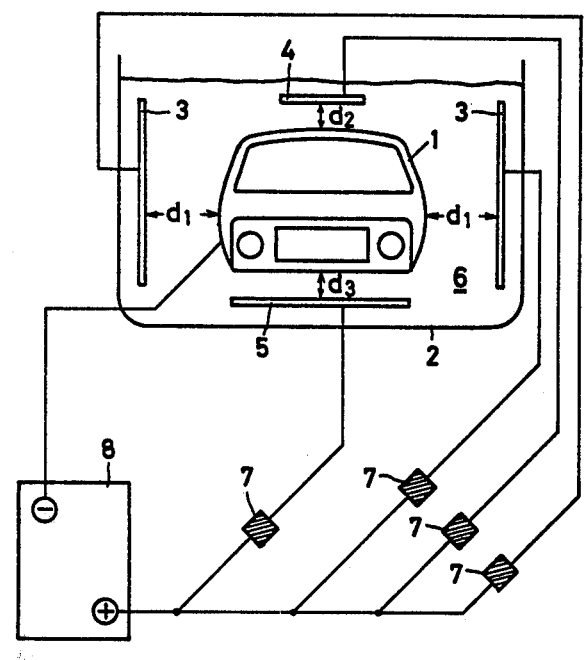

METHOD AND APPARATUS FOR ELECTRODEPOSITION COATING

The present invention relates to an electrodeposition coating method with a powder-containing electrodeposition coating composition. More particularly, this invention concerns an improvement in a method and apparatus for coating an article by electrodeposition in a bath of a powder-containing electrodeposition coating composition hereinafter described in which the amount of current allowed to flow to the anode is controlled to effect the resulting amount of coating on the surface of said article.

Cationic type resin powder-containing electrodeposition coating compositions have already been described, for example, in U.S. Pat. No. 3,869,366 dated Mar. 4, 1975. As stated in said Patent, such a composition has many advantages, as compared with other conventional electrodeposition coating compositions, such that the Coulomb efficiency is higher, satisfactory coating is obtainable in a much shorter period of time, the properties of the coating film are excellent, labor enviroment is excellent for sanitary reasons, safe operation without fire is feasible, improved throwing power is obtainable and labor saving is quite easy and the like.

As stated in the U.S. Pat. No. 3,869,366, such cationic type resin powder-containing electrodeposition coating composition contains, as essential components, a water thinnable cationic synthetic resin which is a nitrogen-containing basic resin partially neutralized with an acid compound, and a synthetic resin in the form of fine powder which is solid at a room temperature but can melt when heated, in a weight ratio of 1–50 parts, preferably 2–10 parts, of said synthetic resin fine powder per 1 part of said cationic synthetic resin, on a solid basis.

In carrying put the electrodeposition coating of the objective article with said cationic type resin powder-containing coating composition, the composition is first diluted with water to obtain an aqueous bath containing usually 10–20% by weight of solid matter, whose pH is adjusted to 4.5–6.5 and the temperature is maintained at 20°–30° C. Into this aqueous bath, are placed, as a cathode, an electrically conductive article to be coated and, as an anode, a stainless steel or carbon electrode, and a voltage (about 100–600 V D.C.) is applied therebetween for 5–60 seconds, so that a coating film is electro-deposited on the surface of said article. The thus formed coating film is then washed with water, dehydrated, dried and baked to obtain a finished film with higher strength. However, in the above-mentioned electrodeposition coating method, there is the problem that depending on the coating conditions and especially the shape of article to be coated and the like, the film thickness, i.e. coating amount, of thus formed coating cannot be even in every portion thereof. As a method for controlling the coating amounts in these conventional electrodeposition coating methods, attempts have been made to control the electrodeposition time, applied voltage or bath temperature and the like in appropriate conditions. Such methods are somewhat effective in the case of using a cationic type resin powder-containing electrodeposition coating composition as in the present invention.

However, in an electrodeposition coating method with cationic type resin powder-containing electrodeposition coating composition (hereinafter merely referred to as powder electrodeposition coating method), the decrease in quantity of current flow with time during the electrodeposition (i.e. electric resistance is increased with time with the increase in coating amount, thereby causing the decrease in current flow proportionally) is of a far lower order than those of the heretofore known electrodeposition coating methods. Therefore, the automatic fluctuation in current flow in resposne to the film forming amount in respect portion of the article hardly occurs and hence, a finished coating film with even or constant thickness is hard to obtain. Furthermore, since the Coulomb efficiency is very high, a slight fluctuation in current flow due to the change in coating conditions will affect markedly on the coating amounts. For these reasons, in the powder electrodeposition coating method, heretofore used coating control methods are insufficient for obtaining uniform coating on every portion of the article regardless of the size and shape thereof, and satisfactory control is unable to carry out.

In order to overcome the abovementioned drawbacks inherent to the powder electrodeposition coating method, the inventors, having studied hard, have come to the present invention. That is, in the invention of this application, there is provided a method and apparatus for coating an article by electrodeposition which comprises using as a bath a liquid including a powder-containing electrodeposition coating composition containing, as essential components, a water thinnable cationic synthetic resin which is a nitrogen-containing basic resin partially neutralized with an acidic compound, and a synthetic resin in the form of fine powder which is solid at a room temperature but can melt when heated. As a cathode, there is employed said article to be coated. A plurality of anodes is also employed. A voltage is applied between the cathode and plural anodes placed in said bath, in which each of the abovementioned anodes is placed against the respective surface of the article to be coated and the amount to be coated on the respective surfaces of the article is controlled by regulating the quantity of electricity allowed to flow to each anode.

Regarding the powder-containing electrodeposition coating compositions and electrodeposition condition to be used in the present invention, reference should be made to said U.S. Pat. No. 3,869,366. Thus, for example, as a basic resin employable in the present invention, there may be mentioned amine containing epoxy resins (aminoepoxy resins), aminoacryl resins, polyamide resins and the like. Examples of synthetic resins used in the form of fine powder are epoxy resins, polyester resins, polyurethane resins, acryl resins and the like. However, the present invention is not limited to the above-mentioned resins only. As an acidic compound which can be used for the neutralization of said basic synthetic resins to impart water thinnability to the same, there may be mentioned organic acids such as formic acid, lactic acid, acetic acid, propionic acid, citric acid, malic acid, tartaric acid and the like and inorganic acids such as phosphoric acid, hydrochloric acid, sulfuric acid, boric acid and the like.

In general, in carrying out an electrodeposition coating on the article with a bath containing a powder electrodeposition coating composition, said article to be coated and electrode(s) are placed in said bath as cathode and anode(s), respectively, and a voltage is applied between them to cause an electrodeposition. However, when the article to be coated is of complicated shape and/or of considerably larger size, the mere employment of one or two anodes arranged sideways along the bath wall is insufficient to obtain a uniform coating due to the difference in the arrangement of the surfaces to be coated as surface facing against the anode(s) and surface facing slopewise or at right angles thereto, or due to the fluctuation in the distance between the anode(s) and the surface to be coated. Furthermore, the fluctuation in distance between the surface to be coated and the bath liquid surface may also affect the coating film thus formed.

Therefore, an additional anode, as a supplemental electrode, is placed facing the surface on which electrodeposition is difficult to accomplish. For example, in carrying out an electrodeposition coating of the article having considerably larger size surfaces which are to be coated uniformly in every direction, like an automobile body, the side electrodes arranged sideways in both sides of the bath are used as main anodes and additional electrodes like the roof electrode placed at the position close to the bath liquid surface and floor electrode placed on the bottom surface of the bath are used as supplemental anodes. In such a case, the distance between the article to be coated and each anode (interelectrode distance) and the area ratio of these electrodes facing each other are determined by the factor of article's shape and therefore, it is quite diffifult to maintain them under identical conditions in every article to be processed.

The inventors have found that in carrying out an electrodeposition coating with such main and supplemental anodes appropriately arranged according to the shape and size of the article to be coated, uniform coating can be formed on every surface of the article by regulating the respective quantity of electricity allowed to flow to each anode and that coating film thickness may be varied portion by portion, if desired, to each optimum range by the modification of said procedure.

For controlling the desired current flow, it is possible to use a constant current flow control device coupled with each anode, or control a voltage to be applied to each anode, or in some case, adjust the anode area to be exposed. Appropriate combination of these methods may also be used.

The invention shall be now explained by referring to the drawing. The FIGURE is a drawing illustrating a mode of practice of the invention, wherein the body of automobile is coated by electrodeposition.

In the FIGURE, a cathode, i.e. article 1 to be coated (in this case, the body of automobile), is placed in the middle part of the electrodeposition bath 2 while being supported by an appropriate suspension means (not shown). A plurality of anodes placed in the bath facing the respective surfaces of the article to be coated consist of a pair of side electrodes 3 as main anodes and a roof electrode 4 and a floor electrode 5 as supplemental anodes. The bath 2 is filled with a bath liquid 6 so that the article 1 is fully dipped thereinto. As shown in the FIGURE, the inter-electrode distance ($d_1$, $d_2$, $d_3$) between the article 1 to be coated and the anodes differs from anode to anode (3, 4 and 5). The area ratio of coating surface to the facing anode is also unfixed. In carrying out an electrodeposition, these anodes are connected to positive pole of a rectifier or transformer 8, and the article to be coated is to negative pole thereof, so that a direct current is caused to flow to form a coating film on said article by electrodeposition. In this case, each different rectifier and/or transformer may be provided to each anode 3, 4 and 5, but this is in general uneconomical, so that in general, one rectifier and/or transformer are/is employed. Therefore, when a constant current is caused to flow for a certain period of time, film thickness of thus formed coating will be varied from portion to portion of said article depending on the position of the surface to be coated, i.e. side, roof and bottom surfaces, and even on the same surface, on the difference in interelectrode distance due to the unevenness thereof. Especially, in the powder electrodeposition coating method of this invention, the abovementioned variation in film thickness is quite remarkable since an improved electrode position is feasible in a relatively shorter period of time. Therefore, in the present invention, there is provided a breaker 7 between the respective anode and rectifier to stop the current flow to each anode at the time when the desired coating film (for example, coating film with each desired film thickness) has been obtained at the intended portion of the article or the desired quantity of electricity has been allowed to pass to the respective anode, the quantity of electricity required for each anode being predetermined as a function of, for example current flow time.

The invention shall be now explained by referring to the following Example, wherein all parts and % are by weight.

EXAMPLE

Electrodeposition bath was prepared as follows:

Cationic resin

253 Parts of Epikote 1001 (trade mark; epoxy resin, product of Shell Chemical), 47 parts of diethanol amine, and 128 parts of isopropylalcohol were reacted under reflux at 85°–90° C. for 4 hours to obtain a liquid aminoepoxy resin. 20 Parts of propionic acid and 552 parts of pure water were added thereto to obtain a water soluble cationic resin liquid of 30% solids content and a neutralization degree of 60%.

Dispersion fine powder

88 Parts of Epikote 1007 (trade mark; epoxy resin, product of Shell Chemical), 262 parts of Epikote 1004 (trade mark; epoxy resin, product of Shell Chemical), 0.7 part of Miki-levelling conc. (trade mark; product of Kyoeisha Yakuhinkagaku K.K.), 18 parts of dicyandiamide, 137 parts of Titan R-550 (trade mark; product of Ishihara Sangyo K.K.) and 3 parts of Carbon MA-100 (trade mark; product of Mitsubishi Kasei K.K.) were melted together and kneaded in an extruder in an ordinary manner. The product was crushed with an impact type crusher to obtain a fine epoxy resin powder with an average particle diameter of 7 microns.

710 Parts of pure water were added to 355 parts of the abovesaid cationic resin and the mixture was well agitated with a dissolver to obtain an aqueous cationic resin solution of 10% solid content. This cationic resin solution was gradually added to 373 parts of the abovementioned dispersion fine powder and the mixture was stirred for 30 minutes. Thereafter, 1762 parts of pure water were added thereto and diluted unitl the solid content became 15%. The characteristics of thus obtained bath liquid are shown in Table 1.

Table 1

| | |
|---|---|
| Solid content | 15% |
| Po/Bi ratio | 3.5% |
| pH | 5.0 |

Table 1-continued

| neutralization degree | 60% |
|---|---|

Note:
Po/Bi ratio = ratio of fine powder weight to cationic resin weight.

Using the abovesaid bath liquid, the body of automobile was coated by electrodeposition as shown in the FIGURE. As shown in the FIGURE, the distance $d_1$, $d_2$ and $d_3$ between the respective anode (side electrode 3, roof electrode 4 and floor electrode 5) and the facing surface of the body differ from each other. This is because the distance $d_2$ or $d_3$ between the roof electrode or floor electrode and the body becomes smaller, in connection with the bath liquid quantity used.

In one test, 300 V D.C. was applied to every electrodes evenly for 30 sec. and in another test, a breaker was provided between the respective anode and the positive pole and the current path was disconnected automatically at the time when a predetermined quantity of electricity has been caused to flow to each intended anode. The film thickness and appearance of thus formed coating are, together with the quantity of electricity passed through, shown in Table 2 at every surface of the body.

Table 2

| Parts of the body | | roof | side | floor |
|---|---|---|---|---|
| Electrodeposition with impressed voltage of 300 V for 30 seconds | film thickness (microns) | 100–110 | 50–60 | 80–90 |
| | quantity of electricity appearance | 5000 pin-holes | 8000 uniform & smooth | 4500 uniform |
| Current flow to each anode was controlled impressed voltage 300 V | quantity of electricity (Coulomb) | 2600 | 8000 | 5500 |
| | film thickness (microns) appearance | 55–60 / uniform & smooth | 50–60 uniform & smooth | 100–120 thicker film |

From the above Table 2, it is apparent that the control of current flow is effective in giving a uniform, smooth coating on every surface of the body. The coating film of the floor was made thicker than others, paying no regard to the appearance thereof, by having increased the quantity of electricity, because this is the portion liable to be injured by stones and other obstacles on the road in the driving.

What we claim is:

1. In a method for coating an article by electrodeposition which comprises: immersing the article to be coated in a bath comprising a powder containing electrodeposition coating composition comprising a water thinnable cationic synthetic resin which is a nitrogen-containing basic resin partially neutralized with an acidic compound and a synthetic resin in the form of fine powder which is solid at a room temperature but can melt when heated;

employing as a cathode, said article to be coated;

and applying a voltage between the cathode and plural anodes placed in the bath, the improvement which comprises positioning the above-mentioned anodes to face the respective surface of said article to be coated and controlling the amount of coating on the respective surfaces of said article by regulating the quantity of electricity flowing to each anode by means of a breaker connected to each anode so that the current flow to each anode is stopped when the desired quantity of electricity has been passed to the particular anode.

2. An apparatus for coating an article by the electrodeposition in an electrodeposition bath comprising an aqueous liquid containing an electrodeposition coating composition containing a water-thinnable cationic resin which is a nitrogen-containing basic resin partially neutralized with an acidic compound and a synthetic resin in the form of a fine powder which is solid at room temperature but can melt when heated, said apparatus comprising: (1) a means for attaching a cathode which is the article to be coated in said bath, (2) a plurality of anodes arranged to face different faces of said cathode within said bath and (3) an electric current source for application of a voltage between each anode and the cathode, and (4) a means for regulating the current to each of said anodes to control the amount of deposition of the coating composition to be deposited on a particular surface of the cathode, said means being a breaker connected to each anode so that the current flow to each anode is stopped when the desired quantity of electricity has been passed to the particular anode.

* * * * *